(12) United States Patent
Tian

(10) Patent No.: US 12,249,296 B2
(45) Date of Patent: Mar. 11, 2025

(54) DATA TRANSMISSION METHOD, DEVICE, CONFERENCE SYSTEM, WIRELESS SCREEN TRANSMITTER AND STORAGE MEDIUM

(71) Applicants: GUANGZHOU SHIYUAN ELECTRONIC TECHNOLOGY COMPANY LIMITED, Guangzhou (CN); GUANGZHOU SHIYUAN INNOVATION TECHNOLOGY CO., LTD., Guangzhou (CN)

(72) Inventor: Nan Tian, Guangzhou (CN)

(73) Assignees: GUANGZHOU SHIYUAN ELECTRONIC TECHNOLOGY COMPANY LIMITED, Guangzhou (CN); GUANGZHOU SHIYUAN INNOVATION TECHNOLOGY CO., LTD., Guangzhou (CN)

( * ) Notice: Subject to any disclaimer, the term of this patent is extended or adjusted under 35 U.S.C. 154(b) by 293 days.

(21) Appl. No.: 18/074,323

(22) Filed: Dec. 2, 2022

(65) Prior Publication Data
US 2024/0040373 A1   Feb. 1, 2024

Related U.S. Application Data

(63) Continuation of application No. PCT/CN2022/108814, filed on Jul. 29, 2022.

(51) Int. Cl.
*G09G 5/00* (2006.01)
*G06F 3/14* (2006.01)

(52) U.S. Cl.
CPC .......... *G09G 5/006* (2013.01); *G06F 3/1454* (2013.01); *G09G 2358/00* (2013.01); *G09G 2370/10* (2013.01); *G09G 2370/16* (2013.01)

(58) Field of Classification Search
CPC ...................................... G06F 3/1454
See application file for complete search history.

(56) References Cited

U.S. PATENT DOCUMENTS

2022/0239698 A1*  7/2022  Anantharaju ......... H04L 63/105

FOREIGN PATENT DOCUMENTS

| CN | 105100907 A | 11/2015 |
|----|-------------|---------|
| CN | 110505471 A | 11/2019 |
| CN | 112040145 A | 12/2020 |

* cited by examiner

*Primary Examiner* — Gustavo Polo
(74) *Attorney, Agent, or Firm* — BAYES PLLC

(57) ABSTRACT

A data transmission method, device, conference system, wireless screen transmitter and storage medium are provided. According to the data transmission method, when the wireless screen transmitter accesses the terminal apparatus and performs screen transmission on the display apparatus, the privacy recognition program is quickly loaded from the wireless screen transmitter to the terminal apparatus. While transmitting corresponding media data to the wireless screen transmitter in real time according to current display screen, the terminal apparatus runs the privacy recognition program to recognize a privacy window in the current display screen and acquires corresponding position information, and then sends the position information to the wireless screen transmitter.

16 Claims, 8 Drawing Sheets

211

212

Business division of Da Ban (20)

Zhang San
Suggesting adding a screen projection function

Li Si
The screen projection function is realized through the screen projector

I think the idea ...

Business division of Da Ban

9:32
2021/10/10

Wechat

Fig. 3

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1− | Vbus | CC | D+ | D− | SBU1 | Vbus | RX2− | RX2+ | GND |
| GND | RX1+ | RX1− | Vbus | SBU2 | D− | D+ | Vconn | Vbus | TX2− | TX2+ | GND |
| B12 | B11 | B10 | B9 | B8 | B7 | B6 | B5 | B4 | B3 | B2 | B1 |

Fig. 6

DATA TRANSMISSION METHOD, DEVICE, CONFERENCE SYSTEM, WIRELESS SCREEN TRANSMITTER AND STORAGE MEDIUM

CROSS-REFERENCE TO RELATED APPLICATION

The present application is a continuation of International Application No. PCT/CN2022/108814, filed on Jul. 29, 2022. The entire content of the above-identified application is expressly incorporated herein by reference.

TECHNICAL FIELD

Embodiments of the present disclosure relate to the field of interactive technology, in particular to a data transmission method, device, conference system, wireless screen transmitter and storage medium.

BACKGROUND

Screen sharing is a frequently used function in the multi-person communication scenarios such as conferences and teaching. In a common screen sharing solution, a terminal apparatus (such as a computer and a mobile phone) as a data source projects screen pictures to a target display apparatus (a display, a television, a projector, etc.) in wired or wireless form, and a display apparatus displays received screen pictures.

Conferences, teaching and other activities are attended by many people, but most of the terminal apparatuses for screen projection are personal devices. During use, software with strong personal attributes may be opened. The software has a risk of privacy and information leakage in the process of terminal apparatuses displaying media data to multiple people through screen projection.

SUMMARY

The present disclosure provides a data transmission method, device, conference system, wireless screen transmitter and storage medium in order to solve a technical problem of a risk of privacy and information leakage in the existing screen projection solution.

In a first aspect, an embodiment of the present disclosure provides a data transmission method, applied to a conference system, wherein the conference system includes a terminal apparatus, a wireless screen transmitter and a display apparatus, the wireless screen transmitter is respectively connected with the terminal apparatus and the display apparatus, the wireless screen transmitter stores a first application program and a second application program; the data transmission method includes: when the wireless screen transmitter is connected with the terminal apparatus, the terminal apparatus provides working voltage for the wireless screen transmitter; the terminal apparatus sends an enquiry data packet to the wireless screen transmitter; the wireless screen transmitter sends response information to the terminal apparatus, wherein the response information includes that the wireless screen transmitter supports a Display Port (DP) working mode; the terminal apparatus sends media data in DP protocol format to the wireless screen transmitter; the wireless screen transmitter sends the first application program to the terminal apparatus; a first confirmation window pops up on a screen of the terminal apparatus, and an instruction of executing the first application program is received through the first confirmation window, wherein the first application program includes a privacy recognition program, and is used to recognize a privacy window in a media content exhibited on the screen of the terminal apparatus and acquire its position information; the terminal apparatus sends the position information to the wireless screen transmitter; the wireless screen transmitter executes the second application program based on received position information and media data, wherein the second application program includes a privacy processing program, and the second application program is used to perform privacy processing on the media data according to the position information; and the wireless screen transmitter sends media data after the privacy processing to the display apparatus, and the display apparatus displays received media data.

In a second aspect, an embodiment of the present disclosure further provides a data transmission method, applied to a wireless screen transmitter, wherein the wireless screen transmitter includes a Type-C port, a wireless module, a microprocessor and a memory, the Type-C port, the memory and the wireless module are electrically connected with the microprocessor, the memory stores a first application program and a second application program, the first application program includes a privacy recognition program, the second application program includes a privacy processing program, and the Type-C port includes a first data port and a second data port; the data transmission method includes: receiving media data in DP protocol format through the first data port, wherein the media data is a media content currently exhibited on a screen of a terminal apparatus; controlling, by the microprocessor, to acquire the first application program from the memory and output the first application program to the terminal apparatus through the second data port, wherein the first application program is used to recognize a privacy window in the media content exhibited on the screen of the terminal apparatus and acquire its position information; receiving the position information sent by the terminal apparatus through the second data port, wherein the position information is position information of the privacy window in the media content exhibited on the screen of the terminal apparatus; executing, by the microprocessor, the second application program based on the position information and the media data, wherein the second application program is used to perform privacy processing on the media data according to the position information; and sending, by the wireless module, media data after privacy processing to the display apparatus.

In a third aspect, an embodiment of the present disclosure further provides a data transmission method, including: receiving media data in DP protocol format through a Type-C port, wherein the media data is a media content currently exhibited on a screen of a terminal apparatus; sending a first application program to the terminal apparatus through the Type-C port, and receiving the position information sent by the terminal apparatus, wherein the position information is position information of a privacy window in the media content exhibited on the screen of the terminal apparatus, the first application program includes a privacy recognition program, and is used to recognize the privacy window in the media content exhibited on the screen of the terminal apparatus and acquire its position information; executing a second application program based on the position information and the media data, wherein the second application program includes a privacy processing program, and is used to perform privacy processing on the media data according to the position information; and encoding media data after the privacy processing and then sending it to the display apparatus.

In a fourth aspect, an embodiment of the present disclosure further provides a conference system, wherein the conference system includes a terminal apparatus, a wireless screen transmitter and a display apparatus, the wireless screen transmitter is respectively connected with the terminal apparatus and the display apparatus, the wireless screen transmitter stores a first application program and a second application program, the terminal apparatus includes a power supply circuit and a central processor, the wireless screen transmitter includes a microprocessor, and the display apparatus includes a display screen and a main processor; wherein: the power supply circuit is configured to provide working voltage for the wireless screen transmitter when the wireless screen transmitter is connected with the terminal apparatus; the central processor is configured to send an enquiry data packet to the wireless screen transmitter; the microprocessor is configured to send response information to the terminal apparatus, wherein the response information includes that the wireless screen transmitter supports a DP working mode; the central processor is further configured to send media data in DP protocol format to the wireless screen transmitter; the microprocessor is further configured to send the first application program to the terminal apparatus; the central processor is further configured to control pop-up of a first confirmation window on a screen of the terminal apparatus, and receive an instruction of executing the first application program through the first confirmation window, wherein the first application program includes a privacy recognition program, and is used to recognize a privacy window in a media content exhibited on the screen of the terminal apparatus and acquire its position information; the central processor is further configured to send the position information to the wireless screen transmitter; the microprocessor is further configured to execute the second application program based on received position information and media data, wherein the second application program includes a privacy processing program, and the second application program is used to perform privacy processing on the media data according to the position information; the microprocessor is further configured to send media data after the privacy processing to the display apparatus; the main processor is configured to control the display screen to display received media data.

In a fifth aspect, an embodiment of the present disclosure further provides a wireless screen transmitter, wherein the wireless screen transmitter includes a Type-C port, a wireless module, a microprocessor and a memory, the Type-C port, the memory and the wireless module are electrically connected with the microprocessor, the memory stores a first application program and a second application program, the first application program includes a privacy recognition program, the second application program includes a privacy processing program, and the Type-C port includes a first data port and a second data port; the microprocessor is configured to: receive media data in DP protocol format through the first data port, wherein the media data is a media content currently exhibited on a screen of a terminal apparatus; control to acquire the first application program from the memory and output the first application program to the terminal apparatus through the second data port, wherein the first application program is used to recognize a privacy window in the media content exhibited on the screen of the terminal apparatus and acquire its position information; receive position information sent by the terminal apparatus through the second data port, wherein the position information is position information of the privacy window in the media content exhibited on the screen of the terminal apparatus; execute the second application program based on the position information and the media data, wherein the second application program is used to perform privacy processing on the media data according to the position information; and send media data after privacy processing to the display apparatus through the wireless module.

In a sixth aspect, an embodiment of the present disclosure further provides a data transmission device, wherein the data transmission device includes a Type-C port, a wireless module, a microprocessor and a memory, the Type-C port, the memory and the wireless module are electrically connected with the microprocessor, the memory stores a first application program and a second application program; the microprocessor is configured to: receive media data in DP protocol format through the Type-C port, wherein the media data is a media content currently exhibited on a screen of a terminal apparatus; send the first application program to the terminal apparatus through the Type-C port, and receive position information sent by the terminal apparatus, wherein the position information is position information of a privacy window in the media content exhibited on the screen of the terminal apparatus, the first application program includes a privacy recognition program, and is used to recognize the privacy window in the media content exhibited on the screen of the terminal apparatus and acquire its position information; execute the second application program based on the position information and the media data, wherein the second application program includes a privacy processing program, and is used to perform privacy processing on the media data according to the position information; and encode media data after the privacy processing and then send it to the display apparatus through the wireless module.

In a seventh aspect, an embodiment of the present disclosure further provides a computer-readable storage medium, on which a computer program is stored, wherein a data transmission method according to any of the first to third aspects is implemented when the computer program is executed by a processor.

In an eighth aspect, an embodiment of the present disclosure further provides a data transmission program, wherein when the program is executed, the data transmission method according to any of the first to third aspects can be implemented.

According to the data transmission method, terminal apparatus, screen transmitter, electronic apparatus and storage medium described above, the data transmission method is applied to a conference system, the conference system includes a terminal apparatus, a wireless screen transmitter and a display apparatus, wherein the wireless screen transmitter is respectively connected with the terminal apparatus and the display apparatus, the wireless screen transmitter stores a first application program and a second application program, the data transmission method includes: when the wireless screen transmitter is connected with the terminal apparatus, the terminal apparatus provides working voltage for the wireless screen transmitter; the terminal apparatus sends an enquiry data packet to the wireless screen transmitter; the wireless screen transmitter sends response information to the terminal apparatus, wherein the response information includes that the wireless screen transmitter supports a DP working mode; the terminal apparatus sends media data in DP protocol format to the wireless screen transmitter; the wireless screen transmitter sends the first application program to the terminal apparatus; a first confirmation window pops up on the screen of the terminal apparatus, and an instruction of executing the first application program is received through the first confirmation window, wherein the first application program includes a privacy recognition program, and is used to recognize a privacy window in a media content exhibited on the screen of the terminal apparatus and acquire its position information; the terminal apparatus sends the position information to the wireless screen transmitter; the wireless screen transmitter executes the second application program based on received position information and media data, wherein the second application program includes a privacy processing program, and the second application program is used to perform privacy processing on the media data according to the position information; the wireless screen transmitter sends media data after the privacy processing to the display apparatus, and the display apparatus displays received media data. When the screen transmitter performs screen projection, the terminal apparatus detects window information of currently displayed software window, confirms whether there is a private window, sends display position information of the private window to the screen transmitter, and enables the screen transmitter to perform privacy processing on privacy information in the screen according to the display position information, and thus avoiding the terminal apparatus from leaking privacy and information when displaying media data to multiple people through the screen projection.

BRIEF DESCRIPTION OF DRAWINGS

In order to describe embodiments of the present disclosure or technical solutions in the related art, the drawings required in the embodiments or the existing technical description will be briefly described hereinafter. The drawings in the following description are only some embodiments of the present disclosure.

FIG. 3 is a schematic diagram of a screen displayed in a display apparatus provided by an embodiment of the present disclosure.

FIG. 6 is a schematic diagram of a pin arrangement at a plug end of a Type-C port.

DETAILED DESCRIPTION

Figure 1:
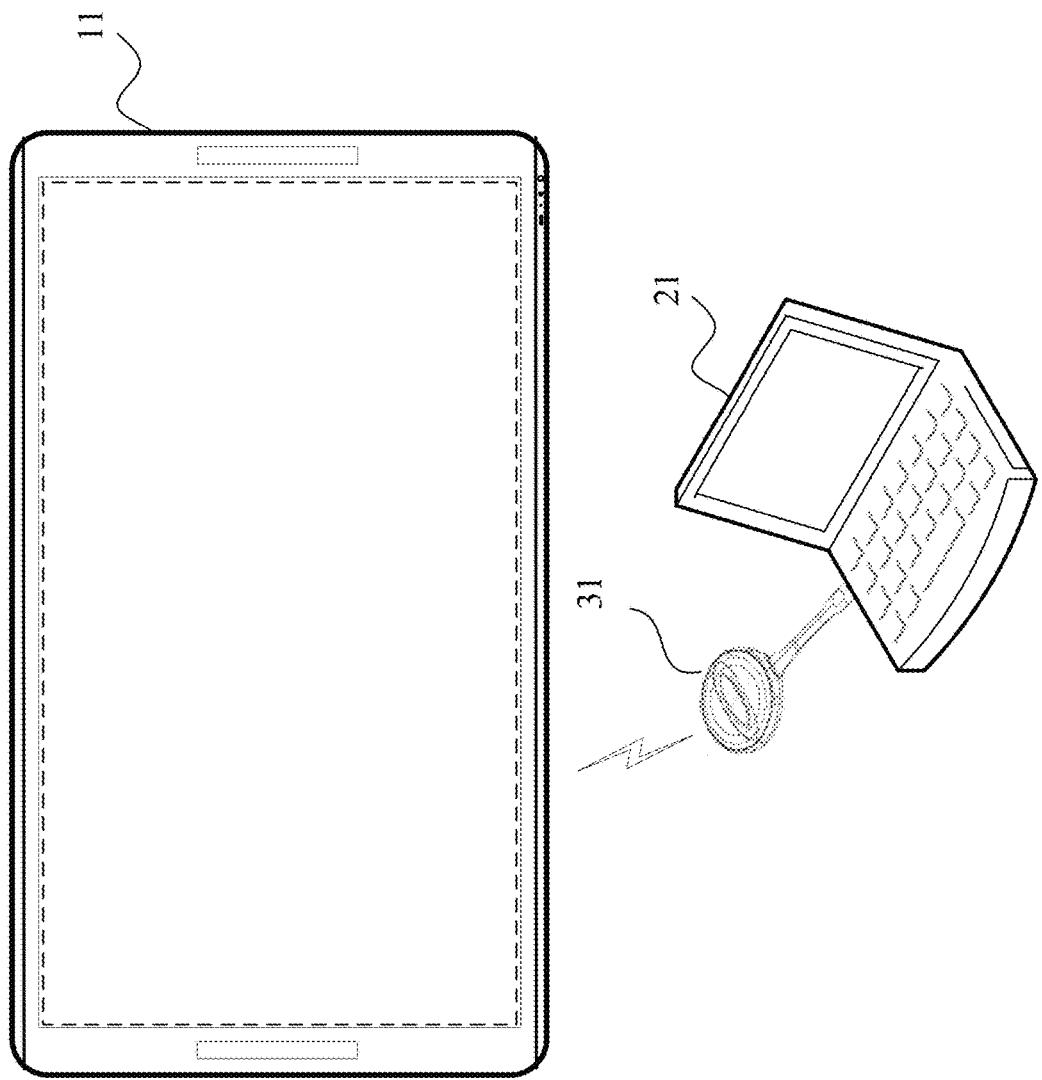
FIG. 1 is a schematic diagram of a device architecture provided by the embodiment of the present disclosure.

In order to make the purpose, technical solution and advantages of the present disclosure clearer, embodiments of the present disclosure will be further described in detail in combination with the accompanying drawings. It can be understood that the specific embodiments described herein are used to explain the present disclosure, not to limit the present disclosure. In addition, it should be noted that, for the convenience of description, only a part but not all structures related to the present disclosure are shown in the drawings.

It should be noted that due to space limitations, the description of the present disclosure does not enumerate all embodiments. After reading the description of the present disclosure, those skilled in the art should be able to think that any combination of technical features can constitute embodiments as long as the technical features do not contradict each other.

Various embodiments will be described in detail hereinafter.

A data transmission device operates between a processing device and a large-screen display device. In an embodiment of the present disclosure, the data transmission device can be a wireless screen transmitter, the processing device can be a terminal apparatus such as a personal computer, a pad, or a mobile phone, the large-screen display device can be an intelligent tablet for conference or conference display device, and the embodiments of the present disclosure do not limit thereto. The wireless screen transmitter processes audio and video data exhibited on a screen of the processing device, so that the data can be exhibited on a large-screen display device for more people to watch and share.

In the related art, a Type-C wireless screen transmitter and the processing device are connected through the Type-C port for data transmission. Therein, the Type-C port, namely USB Type-C, is hereinafter referred to as Type-C port. USB Type-C is a hardware port specification of universal serial bus, which has faster transmission speed (up to 10 Gbps) and stronger power transmission (up to 100 W), and is compatible with USB 2.0, USB 3.0 and Display Port (DP), that is, the Type-C port supports the video output function in DP protocol format. An operating system of the processing device is pre-installed with a general drive protocol. Based on the pre-installed general drive protocol, DP audio and video data corresponding to a media content currently displayed by the processing device can be sent to the wireless screen transmitter, and further the wireless screen transmitter sends the DP audio and video data to the large-screen display device for display. In the above process of the screen projection, a user may open an email or a timely communication tool in the processing device, so as to handle personal affairs. Since the media content corresponding to the DP audio and video data transmitted to the large-screen display device is a copy of the media content corresponding to the DP audio and video data output by the operating system of the processing device, there is a risk of privacy information leakage.

Based on the technical problems in the related art, the solution of an embodiment of the present disclosure is proposed.

Figure 2:
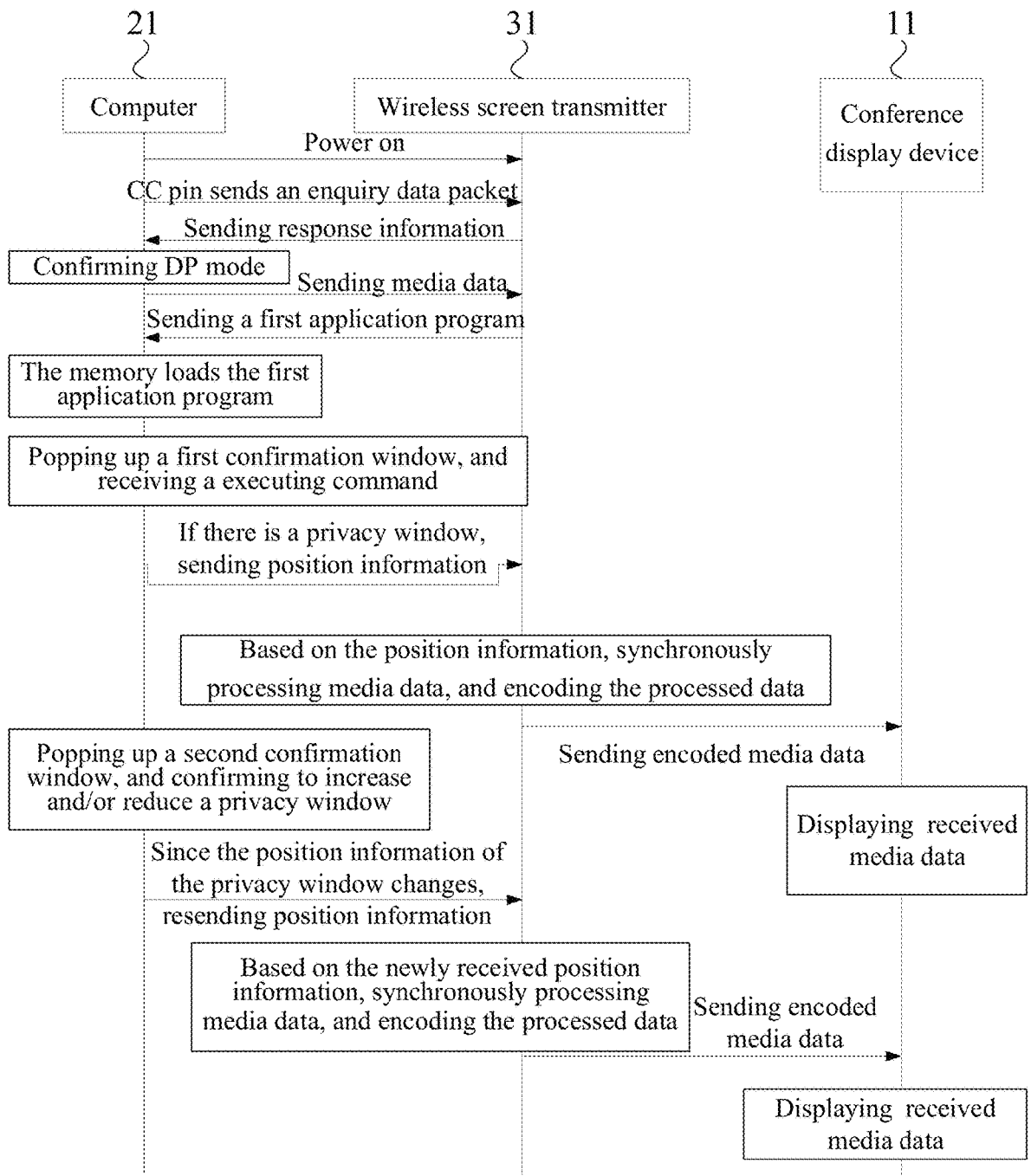
FIG. 2 is a method flowchart of a data transmission method provided by an embodiment of the present disclosure.

Referring to FIG. 1, FIG. 1 is a schematic diagram of the present disclosure realized by a wireless screen transmitter 31 that is disposed between a computer 21 and a conference display device 11. In this embodiment, the wireless screen transmitter 31 is pre-installed with a first application program and a second application program, the first application program includes a privacy recognition program, and the second application program includes a privacy processing program. Meanwhile, in this embodiment, the computer 21 is a computer 21 paired or connected with the wireless screen transmitter 31 for the first time. In some implementations, it can be realized by the following methods, and the overall implementation process of the following methods can refer to the flowchart shown in FIG. 2.

Step 110, connecting a wireless screen transmitter to the computer and starting power on.

In some implementations, the wireless screen transmitter includes a Type-C port, the Type-C port is inserted into a data port of the computer. If the data port of the computer is a Type-C port, it can be directly inserted. If the data port of the computer is a USB port, it needs to be connected through a conversion device. The terminal apparatus can provide the wireless screen transmitter with basic working voltage through a power pin of Type-C port. The working voltage can be 5V or other voltages, and the wireless screen transmitter starts to work under the power supply of the basic voltage.

Step 120, the wireless screen transmitter receives an enquiry data packet sent by the computer and sends response information to the computer.

In some implementations, after the wireless screen transmitter is powered on, the computer can send an enquiry data packet to the wireless screen transmitter through a Configuration Channel (CC) pin of Type-C port. The enquiry data packet can be information customized by the supplier. After receiving the signal, the wireless screen transmitter sends the response information to the computer through its CC pin. The response information is used to describe an apparatus attribute of the wireless screen transmitter, and can include information such as a current working mode of the wireless screen transmitter or a working mode supported by the wireless screen transmitter being DP mode, specific power supply range, etc., and the device type of the wireless screen transmitter being described as an external storage apparatus. The computer can set the power supply voltage to the wireless screen transmitter according to the power supply range information.

Step 130, the wireless screen transmitter receives the media data in DP protocol format sent by the computer, wherein the media data includes at least one of the video data or audio data displayed by the computer.

In some implementations, after the computer receives the response information sent by the wireless screen transmitter, when the computer confirms that the current working mode of the wireless screen transmitter is DP mode, the Type-C port of the computer can be set to work in DP mode, and the operating system of the computer is called to pre-install the DP driver. For example, if the computer supports the Type-C port, media data in DP protocol format including audio and video can be transmitted to a differential signal transmission pin pair of the wireless screen transmitter (as Display Port, i.e., the first data port) through a differential pin pair in the Type-C port of the computer.

Step 140, the computer acquires the first application program.

In some implementations, the computer can receive the first application from the wireless screen transmitter, or acquire the first application from a third-party device, or acquire the first application from a specific website.

Further, for example, when the computer receives the first application program from the wireless screen transmitter for the first time, a possible operation process can be as follows.

In some implementations, after receiving the response information sent by the wireless screen transmitter, the computer can further display a drive letter of the corresponding external storage apparatus according to the description of its device type. When the computer is paired or connected with the wireless screen transmitter for the first time, the user needs to open the operation of the drive letter corresponding to the wireless screen transmitter at the computer terminal, so as to display a content stored in the storage space of the wireless screen transmitter, that is, the icon corresponding to a program stored in the wireless screen transmitter, such as an icon of the first application. When receiving a double-click or right-click operation for the icon of the first application, the storage program of the wireless screen transmitter is loaded into a memory of the computer through USB 2.0 data transmission pins (D+ and D−, that is, the second data port) of the Type-C port, which is for the processor of the computer to execute, so as to acquire the position information of the privacy processing window currently displayed on the computer screen.

Step 150, the wireless screen transmitter receives the position information sent by the computer, wherein the position information is position information of the private window in the media content displayed on the computer screen.

In some implementations, when the first application program is loaded into the memory of the computer, a first confirmation window pops up. When the first application program includes programs of projection control and privacy recognition, users can confirm, based on this window, whether to perform privacy recognition (such as by checking confirmation) and whether to start the screen transmission (such as by clicking a button for confirmation). If the user confirms that it is necessary to perform privacy recognition at the same time in the subsequent projection process based on the first confirmation window that pops up, during the projection process, the position information of the privacy processing window displayed in the current screen picture of the computer can be acquired and sent to the second data port of the wireless screen transmitter through the USB 2.0 data transmission pins (D+ and D−), otherwise, the position information cannot be acquired and sent. Therein, a role of the projection control program is to achieve that: the user can choose a main screen or an expansion screen for projecting, can choose the window of a specific application instead of the whole screen for projecting, can choose to add a screen in adding form (multiple screens on the same screen) or in grabbing form, can choose whether to project sound, whether to project a mouse pointer, and can choose a picture quality, which can be set in the first confirmation window that pops up. The privacy recognition program can include a preset list. The privacy-window model information included in the preset list can be the system default configuration or user-defined configuration. The software corresponding to the privacy window can include social software, instant communication software, email software, etc., which is not limited herein. The privacy-window model information can be a process name and a window name. In the process of the processor of the computer executing the privacy recognition program, the information of the currently displayed window on the screen picture can be acquired, and the information in the preset list is matched according to the information of the window. If the information of a certain display window matches the model information recorded in the preset list, the display window is confirmed as a private window, and the position of the private window needs to be sent to the wireless screen transmitter. In addition, in some implementations, when the first application program (including the privacy recognition program and excluding the projection control program) is loaded into the memory of the terminal apparatus, the first confirmation window pops up. Based on this window, the user can confirm whether to perform privacy recognition. Whether to start screen transmission at this time can be determined by receiving a screen transmission instruction through a hardware button of the wireless screen transmitter.

Corresponding to the position information of the privacy window recognized by the computer and the corresponding sending process, the wireless screen transmitter receives the position information data through the second data port. The position information data is parsed by the microprocessor to obtain the position information, and the media data is processed based on the position information.

Step 160, the wireless screen transmitter executes a second application program, wherein the second application program is used to perform privacy processing on the media data according to the position information.

In some implementations, the wireless screen transmitter executes the second application program based on the received position information data of the privacy window, processes a corresponding region of synchronously received video media data based on the position information data, and encodes the audio data and the processed video media data to acquire the compressed media data. This processing method includes adding a mosaic layer, covering with a preset graphic template, deleting image data regionally, etc. Therein, adding a mosaic layer is to fuse multiple adjacent pixels according to the existing pixel data in the region, so that original image contents cannot be clearly displayed. Covering with a preset graphic template is to cover a region whose position information is confirmed with a preset graphic template without privacy information. The graphic template can correspond to the software window or unrelated to the software window, which has little impact on the display effect of the entire screen picture. Deleting image data regionally is to cover a region whose position information is confirmed with a certain color, which is the simplest way to process the image regionally.

In some implementations, when not receiving the position information data of the privacy window, based on the screen transmission instruction output by the user and received by the microprocessor of the wireless screen transmitter, the wireless screen transmitter starts to compress and encode the received audio media data and (unprocessed) video media data. The compressed media data is sent to the large-screen display device for display through the communication network. In some implementations, the microprocessor of the wireless screen transmitter can receive the screen transmission instruction through a screen transmission button of the wireless screen transmitter. Therein, the screen transmission button of the wireless screen transmitter is a hardware button, which is disposed on an upper surface or a side surface of the wireless screen transmitter. The screen transmission button of the wireless screen transmitter can also be a software button, and the software button is realized through programs, and is disposed on the interface of the display screen of the wireless screen transmitter or is disposed on the display interface of the processing device. The user can start the compression and encoding of audio and video data by clicking the software button (i.e., the first confirmation window).

Step 170, the wireless screen transmitter sends the encoded media data to the display apparatus.

In some implementations, the wireless screen transmitter sends the encoded media data to the display apparatus for display through its wireless module via the communication network. Therein, the display apparatus can have a receiving box, and the receiving box can be integrated with the display apparatus or designed separately from the display apparatus. The receiving box is used to receive the media data from the wireless screen transmitter and transmit it to the display apparatus for display.

In addition, it should be noted that when the microprocessor of the wireless screen transmitter receives the screen transmission instruction output by the user, it initiates to start compressing and encoding the received audio media data and processed (or unprocessed) video media data. Before the microprocessor of the wireless screen transmitter receives the screen transmission instruction output by the user, although the media data is received at this time, the received audio and/or video media data is discarded without compression or transmission processing, so as to save resources for the microprocessor of the screen transmitter. That is, sending the encoded media data to the display apparatus in Step 170 can be a step executed after confirming the receipt of the screen transmission instruction in Step 140.

In another embodiment, on the basis of the above, the method can further include the following steps.

Step 180, the wireless screen transmitter receives the position information obtained by the computer according to a privacy-processing confirmation instruction, and performs privacy processing on the media data according to the position information.

In some implementations, when the computer executes the privacy recognition program and recognizes that there is a privacy window in the current display window of the screen picture, a second confirmation window further pops up, wherein the second confirmation window is used to receive the privacy-processing confirmation instruction. Therein, the privacy-processing confirmation instruction is used to instruct increasing and/or reducing a privacy window where the privacy processing is performed. According to the privacy-processing confirmation instruction, the position information of the privacy window is sent to the wireless screen transmitter. The wireless screen transmitter performs privacy processing for video media data according to the updated position information. Therein, the second confirmation window displays a list of privacy windows matching the privacy-window model information in the preset list, and the user confirms whether to continue privacy processing for the privacy window in the second confirmation window. The second confirmation window can further display the list of windows currently displayed by the terminal apparatus. In the second confirmation window, the user can confirm whether to continue the privacy processing for the privacy window, and further can confirm whether the non-privacy window also needs to enter a privacy processing state. In addition, since the time for the user to confirm in the second confirmation window is not controllable, when the computer executes the privacy recognition program, as long as it recognizes that there is a privacy window in the current display window of the screen picture, it can automatically send the position information of the privacy window to the wireless screen transmitter. The wireless screen transmitter can perform privacy processing on the synchronously received media data based on the position information, thus avoiding the leakage of the user's privacy. In addition, the position information can be sent when the display position of the privacy window changes. That is, if the display position of the privacy window does not change, the terminal apparatus does not send the position information, and the screen transmitter performs privacy processing according to the position information received previously, if the display position of the privacy window changes, the terminal apparatus updates and sends the position information accordingly. This change may be caused by the opening of a new software window, or by the closing, minimizing, moving or ending of the privacy processing status of the existing privacy window. The position information can also be sent in real time, that is, the position information is sent synchronously with the screen picture.

Figure 4:
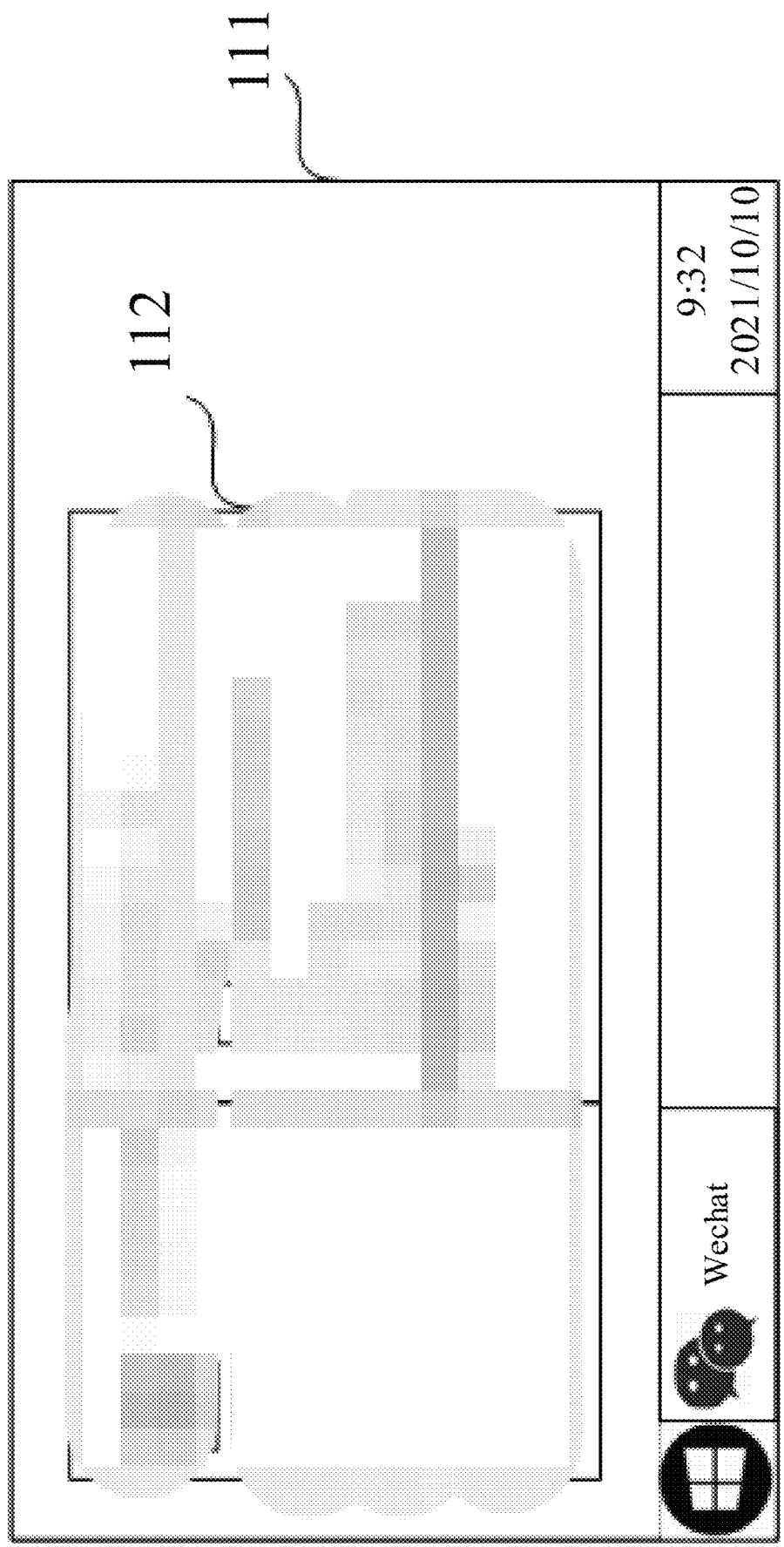
FIG. 4 is a schematic diagram of a screen transmission effect of the screen displayed in FIG. 3 on the display apparatus.

Referring to FIGS. 3 and 4, FIGS. 3 and 4 respectively show display effect diagrams of a certain privacy window in the computer 21 and the conference display device 11. Based on the connection state shown in FIG. 1, at some time during the screen transmission process, a display window 212 of a social software is opened in a screen picture 211 of the computer 21 according to the user's operation, the computer 21 pops up a second confirmation window, and receives a privacy-processing confirmation instruction for the social software at the second confirmation window. In response to the privacy-processing confirmation instruction, the computer 21 sends the position information of the display window 212 of the social software to the wireless screen transmitter. Definitely, there is a period between the time of opening the display window 212 and the time of receiving the privacy-processing confirmation instruction, and during this period, the position information of the display window 212 is sent by default. If the instruction received by the second confirmation window is not used to perform privacy processing on the social software, the position information of the remaining privacy windows is updated accordingly after receiving the instruction. The computer 21 further takes the entire screen picture 211 as media data, and sends it to the wireless screen transmitter 31 in real time. The wireless screen transmitter 31 performs privacy processing on the media data according to the position information in the process of executing the second application, that is, the wireless screen transmitter 31 performs privacy processing on a region in the media data corresponding to the position information. The processed media data is sent to the conference display device 11 for display, and the effect is shown in FIG. 4. In the conference display device 11, corresponding to a projection picture 111 for displaying media data, the information of the display window 112 of the social software can no longer be clearly displayed.

In an embodiment, an apparatus identification is added to the media data sent by the wireless screen transmitter 31 to the conference display device 11, and the apparatus identification carries data source information, that is, the apparatus identification is an identification of the media data corresponding to the computer 21 or personal account information of an initiator of the multi person interaction. Because there is an identification and the identification is set as an invisible identification, in the case where multiple interactive participants take photos on the spot and spread the photos, the data source information can be confirmed according to the identification in the spread photos, and the information leaked can be traced.

Figure 5:
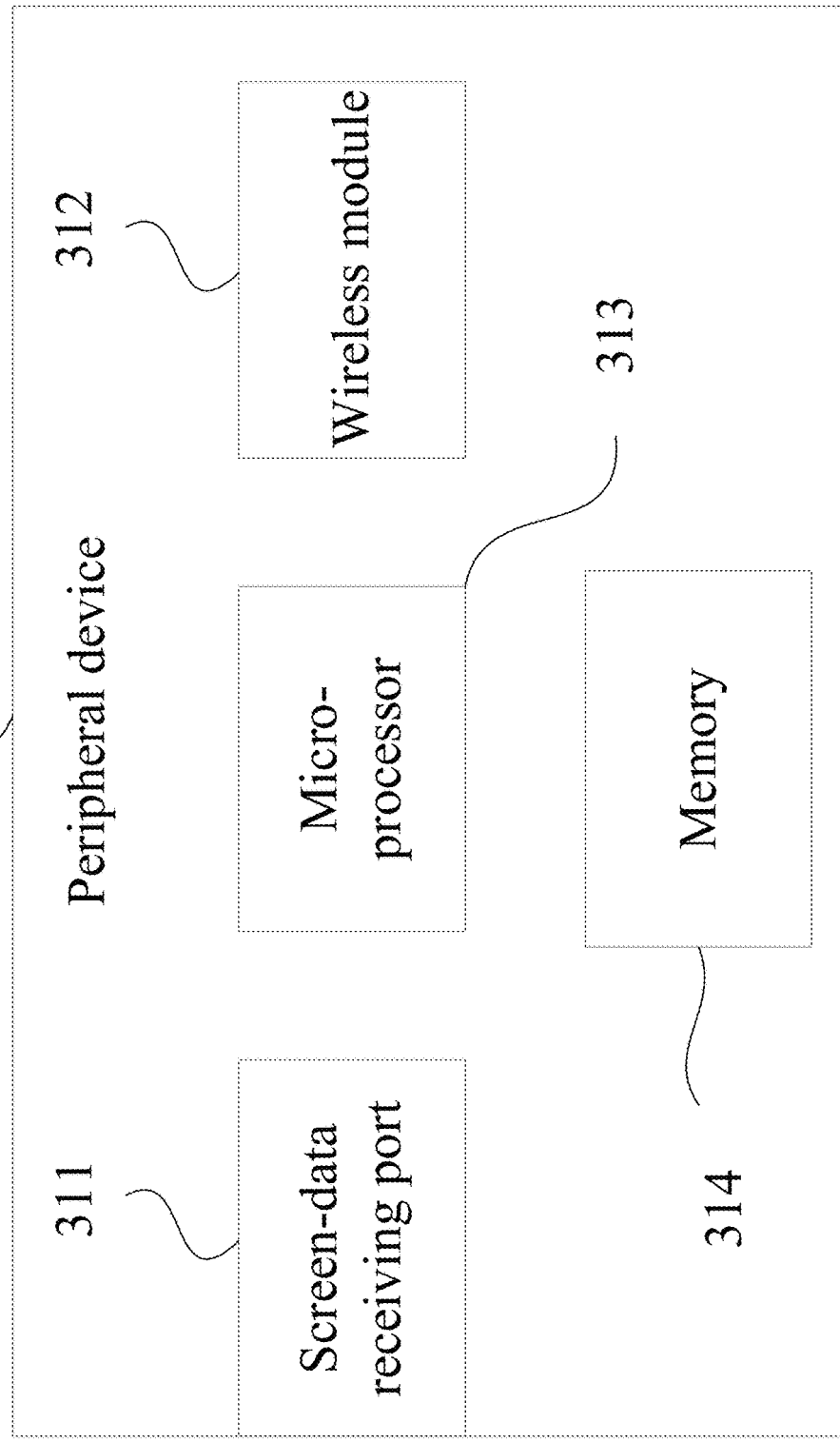
FIG. 5 is a structure diagram of a peripheral device provided by an embodiment of the present disclosure.

FIG. 5 is a structure diagram of a peripheral device provided in the embodiments of the present disclosure. The peripheral device 30 is a data transmission device, which can also be Type-C wireless screen transmitter 31 shown in FIG. 1, including a screen-data receiving port 311 (which can be a Type-C port), a wireless module 312, a microprocessor 313 and a memory 314. Therein, the memory 314 is connected with the microprocessor 313, and the memory 314 stores executable programs in advance, that is, the first application program which includes a privacy recognition program, or a projection control program and a privacy recognition program, both of which can be integrally developed. In addition, the memory 314 also stores a second application program which includes a privacy processing program. When the processing device is connected with the peripheral device 30, the first application program for screen projection will be automatically downloaded to the processing device.

When the processing device receives the user's instruction for screen projection and privacy recognition, the first application program is used to recognize the position information of the privacy window in the screen picture currently displayed by the processing device, and send the position information and the projection starting instruction to the wireless screen transmitter. In some implementations, the user may not choose to perform privacy recognition. At this time, the processing device can only receive the user's projection instruction, and send the projection instruction to the peripheral device 30. The screen-data receiving port 311 is used to connect a video signal port of the processing device, so as to acquire uncompressed audio and video data output by the video signal port and the position information of the privacy window (if there is the position information of the privacy window). The microprocessor 313 is connected with the screen data port 311. The microprocessor 313 executes the second application program based on the received audio and video data and the position information of the privacy window, that is, processes the video data based on the position information of the privacy window. The microprocessor compresses and encodes the audio data and processed video data based on the received projection starting instruction. In addition, when the microprocessor 313 does not receive the position information of the privacy window, the microprocessor compresses and encodes the received audio and video data based on the received projection starting instruction. The wireless module 312 is further connected with the microprocessor 313. The wireless module 312 is used to communicate with the wireless communication network, and transmit the received audio and video data after compression and encoding processing to the matched network node in the wireless communication network, such as the network node module of the large-screen display device for conference. Therein, the wireless module 312 is a modular product realized by means of wireless communication technology, which can send the received signal to the wireless communication network wirelessly, so that the signal is captured by the network node in the wireless communication network, such as Wi-Fi module, Bluetooth module or ZigBee module.

In some implementations, the peripheral device 30 may further include a data conversion chip. The screen-data receiving port 311 is connected with the data conversion chip. The data conversion chip is connected with the screen-data receiving port 311 and the microprocessor 313 respectively, and the microprocessor 313 is connected with the wireless module 312 and the memory 314 respectively. The data conversion chip is used to convert the media content in the data packet corresponding to the DP protocol received from the user's processing device into a data format suitable for the microprocessor 313. In some implementations, the data conversion chip can convert the video part of the media content into data in Mobile Industry Processor Interface (MIPI) format, and convert the audio part of the media content into data in I2S format. After the format conversion of the data conversion chip, the two types of formatted media data can be provided to the microprocessor 313. In some implementations, the microprocessor 313 is a hardware processor (such as ARM processor), and the microprocessor 313 can compress and encode two types of formatted media data.

The processing device refers to a device including a first processor that is equipped with a first operating system, a video signal port, and a first display, such as a laptop, mobile phone, tablet computer, and other terminal apparatuses. It can be seen from the above feature definition that the process of audio and video communication between peripheral devices and the video signal port referred to in the embodiment of the present disclosure is subject to constraint from the general drive protocol pre-installed in the first operating system, and it is possible to perform audio and video communication with peripheral devices based on the pre-installed general driver protocol without installing a driver program on the first operating system. Audio and video communication includes output audio and video data. In some implementations, the processing device is generally provided with multiple ports, such as power port, Universal Serial Bus (USB) port, Auxiliary (AUX) port, High Definition Multimedia Interface (HDMI) port, Video Graphics Array (VGA) port or DP port, etc. The video signal ports such as HDMI port, and VGA port or DP port are ports used to transmit audio and video data, which also work based on the general drive protocol pre-installed in the first operating system. That is, the audio and video data format output by these video signal ports is the audio and video data output format supported by a native system, and can be transmitted to the peripheral device without conversion such as compression and encoding. When connecting the processing device through these video signal ports, the peripheral device will acquire the first audio and video data output by the processor in the processing device at this time, and the media content corresponding to the first audio and video data is the same as the media content currently displayed on the first display. When the processing device is connected with the peripheral device 10, the executable first application program is downloaded to the memory of the processing device. When the processing device receives the user's instructions for screen projection and privacy recognition, the first application program is run by the first processor, so as to recognize the position information of the privacy window in the screen picture currently displayed by the processing device, and send the position information and screen projection instructions to the wireless screen transmitter.

In one embodiment, the screen-data receiving port 311 in the peripheral device 30 may be an above-mentioned Type-C port. As shown in FIG. 6, the Type-C port has 24 pins, including two rows of pins with the same function. Two rows of pins with the same function support forward or reverse insertion. The Type-C port includes two pairs of power supply pins (A9, B4, B9, A4), four pairs of differential pins (A11 and B2, A10 and B3, A3 and B10, A2 and B11), and CC pin (A5) used for pairing communication when inserting and pairing. Therein, TX+, TX−, RX+ and RX− in each group of pins are differential-signal transmitting pins, and each group of differential-signal transmitting pins supports working in USB mode or DP mode. When the differential-signal transmitting pin pair works in USB mode, the signal transmission pin pair transmits USB 3.0 signals. When the differential-signal transmitting pin pair works in DP mode, the signal transmitting pin pair is used as the DP (i.e., the first data port).

As an embodiment, the data transmission device is a wireless screen transmitter with a Type-C port as an example for detailed description. The wireless screen transmitter includes a Type-C port, a wireless module, a microprocessor and a memory. The Type-C port, the wireless module and the memory are electrically connected with the microprocessor respectively. Therein, the Type-C port includes the first data port and the second data port. The specific implementation method is as follows.

When the wireless screen transmitter is connected with the Type-C receiving port of the terminal apparatus through the Type-C port, power on is started. The terminal apparatus provides the basic working voltage to the wireless screen transmitter through the power supply pin of Type-C port, which can be 5V or other voltages. The wireless screen transmitter starts to work under the power supply of the basic voltage. After the wireless screen transmitter is powered on, the terminal apparatus sends an enquiry data packet to the wireless screen transmitter through a CC pin. The enquiry data packet can be a signal customized by the supplier. After receiving the signal, the wireless screen transmitter sends response information to the terminal apparatus through its CC pin accordingly. The response information is used to describe the apparatus attributes of the wireless screen transmitter, In some implementations, it can include information such as the current working mode or the supported working mode of the wireless screen transmitter being DP mode, the specific power supply range, etc., and the apparatus type of the wireless screen transmitter being described as an external storage apparatus. After receiving the response information sent by the wireless screen transmitter, the terminal apparatus displays the drive letter of the corresponding external storage apparatus according to the description of the device type. The terminal apparatus can further adjust the power supply voltage to the wireless screen transmitter according to the power supply range information. When the terminal apparatus recognizes that the current working mode or the supported working mode of the wireless screen transmitter is DP mode, the Type-C port of the terminal apparatus is set to work in DP mode, and the operating system of the terminal apparatus is called to pre-install the DP drive, and the media data in DP protocol format including audio and video is transmitted to the first data port of the wireless screen transmitter through the differential pins in the Type-C port of the terminal apparatus.

If the terminal apparatus accesses the wireless screen transmitter through the Type-C port for the first time, after receiving the user's operation of opening the external storage apparatus (such as the operation of opening the drive letter corresponding to the wireless screen transmitter), the terminal apparatus displays the content stored in its storage space, that is, an icon corresponding to the stored program in the wireless screen transmitter: the icon of the first application program. When receiving the double-click or right-click operation on the icon, programs stored in the wireless screen transmitter is loaded into the memory of the terminal apparatus through the USB 2.0 data transmission pins (D+ and D−, that is, the second data port) of the Type-C port for the processor of the terminal apparatus to execute, so as to acquire the position information of the privacy processing window currently displayed in the screen picture of the terminal apparatus. After the terminal apparatus is installed with corresponding services, when it accesses the wireless screen transmitter through Type-C port again, the user does not need to manually perform the above operations. Based on the installed service, the terminal apparatus can automatically loaded the first application program from the wireless screen transmitter to the terminal apparatus through the USB 2.0 (i.e., the second data port) data transmission pin for the processor of the terminal apparatus to execute, so as to acquire the position information of the privacy processing window currently displayed in the screen picture of the terminal apparatus, and send the position information and screen projection instruction to the wireless screen transmitter. At this time, the user can realize privacy processing with little sense of operation. Therein, the Type-C receiving port in the terminal apparatus has the USB 2.0 data transmission pins D+ and D− corresponding to the USB 2.0 (second data port) data transmission pins of the Type-C port of the wireless screen transmitter.

When the first application program (including projection control and privacy recognition program) is loaded into the memory of the terminal apparatus, a first confirmation window pops up, and based on this window, the user can confirm whether to start the screen transmission and whether to perform privacy recognition. If based on the first confirmation window that pops up, the user confirms that privacy recognition needs to be performed simultaneously in the subsequent screen projection process, then during the screen projection process, the position information of the privacy processing window currently displayed in the screen picture can be acquired and sent to the second data port of the wireless screen transmitter through the USB 2.0 data transmission pins (D+ and D−), otherwise, the position information cannot be acquired and sent. Therein, the role of the screen projection control program is to achieve that: the user can choose whether to project to the main screen or the expansion screen, can choose to project to a specific application instead of the whole screen, can choose to add a screen in adding form (multiple screens on the same screen) or in grabbing form, can choose whether to project sound, whether to project a mouse pointer, and can choose the picture quality, which can be set in the first confirmation window that pops up. In some implementations, when the first application program (including the privacy recognition program, excluding the projection control program) is loaded into the memory of the terminal apparatus, the first confirmation window pops up. Based on this window, the user can confirm whether to perform privacy recognition. Whether to start screen transmission at this time can be determined by receiving the screen transmission instruction through the hardware button of the wireless screen transmitter. The privacy processing program can include a preset list. The privacy-window model information included in the preset list can be either the system default configuration or user-defined configuration. The privacy software can include social software, instant messaging software, email software, etc., which is not limited herein. The privacy-window model information can be a process name and a window name. In the process of the processor of the terminal apparatus executing the privacy recognition program, the information of the currently displayed window in the screen picture can be acquired, and the information in the preset list is matched according to the information of the window. If the information of a certain display window matches the model information recorded in the preset list, the display window is confirmed as a private window, and the position of the private window needs to be sent to the wireless screen transmitter.

When the wireless screen transmitter receives the position information data of the privacy window, the microprocessor executes the second application program, which includes a privacy processing program, and processes the corresponding region of the synchronously received video media data based on the position information data. The processing method includes adding a mosaic layer, covering with a preset graphic template, deleting image data regionally, etc. Therein, adding a mosaic layer is to fuse multiple adjacent pixels according to the existing pixel data in the region, so that the original image contents cannot be clearly displayed. Covering with a preset graphic template is to cover a region whose position information is confirmed with a graphic template without privacy information. The graphic template can correspond to the software window or unrelated to the software window, which has little impact on the display effect of the entire screen picture. Deleting image data regionally is to cover a region whose position information is confirmed with a certain color, which is the simplest way to process the region image. In addition, it should be noted that when the microprocessor of the wireless screen transmitter receives the screen-transmission start instruction output by the user, it initiates to start compressing and encoding the received audio media data and processed (or unprocessed) video media data.

In some implementations, when not receiving the position information data of the privacy window, based on the screen transmission instruction output by the user and received by the microprocessor of the wireless screen transmitter, the wireless screen transmitter starts to compress and encode the received audio media data and (unprocessed) video media data. The compressed media data is sent to the large-screen display device for display through the communication network. In some implementations, the microprocessor of the wireless screen transmitter can receive the screen transmission instruction through the screen transmission button of the wireless screen transmitter. Therein, the screen transmission button of the wireless screen transmitter is a hardware button, which is disposed on the upper surface or the side surface of the wireless screen transmitter. The screen transmission button of the wireless screen transmitter can also be a software button, and the software button is realized by programs, and is disposed on the interface of the display screen of the wireless screen transmitter or is disposed on the display interface of the processing device. The user can start the compression and encoding of audio and video data by clicking the software button (i.e., the first confirmation window).

In another embodiment, on the basis of the above contents, when the terminal apparatus executes the privacy recognition program and recognizes that there is a privacy window in the current display window of the screen picture, a second confirmation window further pops up, wherein the second confirmation window is used to receive the privacy-processing confirmation instruction. Therein, the privacy-processing confirmation instruction is used to instruct increasing and/or reducing a privacy window where the privacy processing is performed. According to the privacy-processing confirmation instruction, the position information of the privacy window is sent to the wireless screen transmitter. The wireless screen transmitter performs privacy processing on video media data according to the updated position information. Therein, the second confirmation window displays a list of privacy windows matching the privacy-window model information in the preset list, and the user confirms whether to continue privacy processing for the privacy window in the second confirmation window. The second confirmation window can further display the list of windows currently displayed by the terminal apparatus, and in the second confirmation window, the user can confirm whether to continue the privacy processing for the privacy window, and further confirm whether a software window normally displayed needs to enter the privacy processing state. In addition, since the time for the user to confirm in the second confirmation window is not controllable, when executing the privacy recognition program, as long as the terminal apparatus recognizes that there is a privacy window in the current display window of the screen picture, the terminal apparatus can automatically send the position information of the privacy window to the wireless screen transmitter. The wireless screen transmitter can perform privacy processing on the synchronously received media data based on the position information. In addition to that the second confirmation window pops up when the privacy window is detected, the second confirmation window can also pop up when a window trigger instruction is received. Based on the pop-up methods, it can allow the user to actively change the privacy processing status of the existing display window, for example, users can actively cancel the privacy processing of the display window that needs privacy processing originally, or let the display window that does not need privacy processing originally into the privacy processing status.

In addition, the position information can be sent when the display position of the privacy window changes. That is, if the display position of the privacy window does not change, the terminal apparatus does not send the position information, and the screen transmitter performs privacy processing according to the position information received previously, if the display position of the privacy window changes, the terminal apparatus updates and sends the position information accordingly. This change may be caused by the opening of a new software window, or by the closing, minimizing, moving or ending of the privacy processing status of the existing privacy window. The position information can also be sent in real time, that is, the position information is sent synchronously with the screen picture.

From the perspective of data transmission in the wireless screen transmitter, the embodiment of the present disclosure can further be realized by the following method, and the method includes: receiving media data in DP protocol format through the Type-C port, wherein the media data is a media content currently displayed on the screen of the terminal apparatus; sending the first application program to the terminal apparatus through the Type-C port, and receiving the position information sent by the terminal apparatus, wherein the position information is position information of the private window in the media content exhibited on the screen of the terminal apparatus, the first application program includes a privacy recognition program, which is used to recognize the privacy window in the media content exhibited on the screen of the terminal apparatus and acquire its position information; executing the second application program based on the position information and media data, wherein the second application program includes a privacy processing program, which is used to perform privacy processing of media data according to the position information; and encoding media data after privacy processing and sending it to the display apparatus.

In some implementations, the Type-C port includes a first data port and a second data port.

Correspondingly, the step of receiving media data in DP protocol format through the Type-C port includes:
 receiving the media data in DP protocol format through the first data port of Type-C port.
 the step of sending the first application program to the terminal apparatus through the Type-C port, and receiving the position information sent by the terminal apparatus includes:
 sending the first application program to the terminal apparatus through the second data port of the Type-C port, and receiving the position information sent by the terminal apparatus.

In some implementations, the privacy recognition program includes a preset list, the preset list includes the privacy-window model information, and the privacy window is recognized according to the privacy-window model information.

In some implementations, the wireless screen transmitter can further add an apparatus identification of the terminal apparatus to the media data.

The process of data transmission in this embodiment has been described above based on the embodiment of the hardware device. For the description not covered herein, reference can be made to the previous content.

Figure 7:
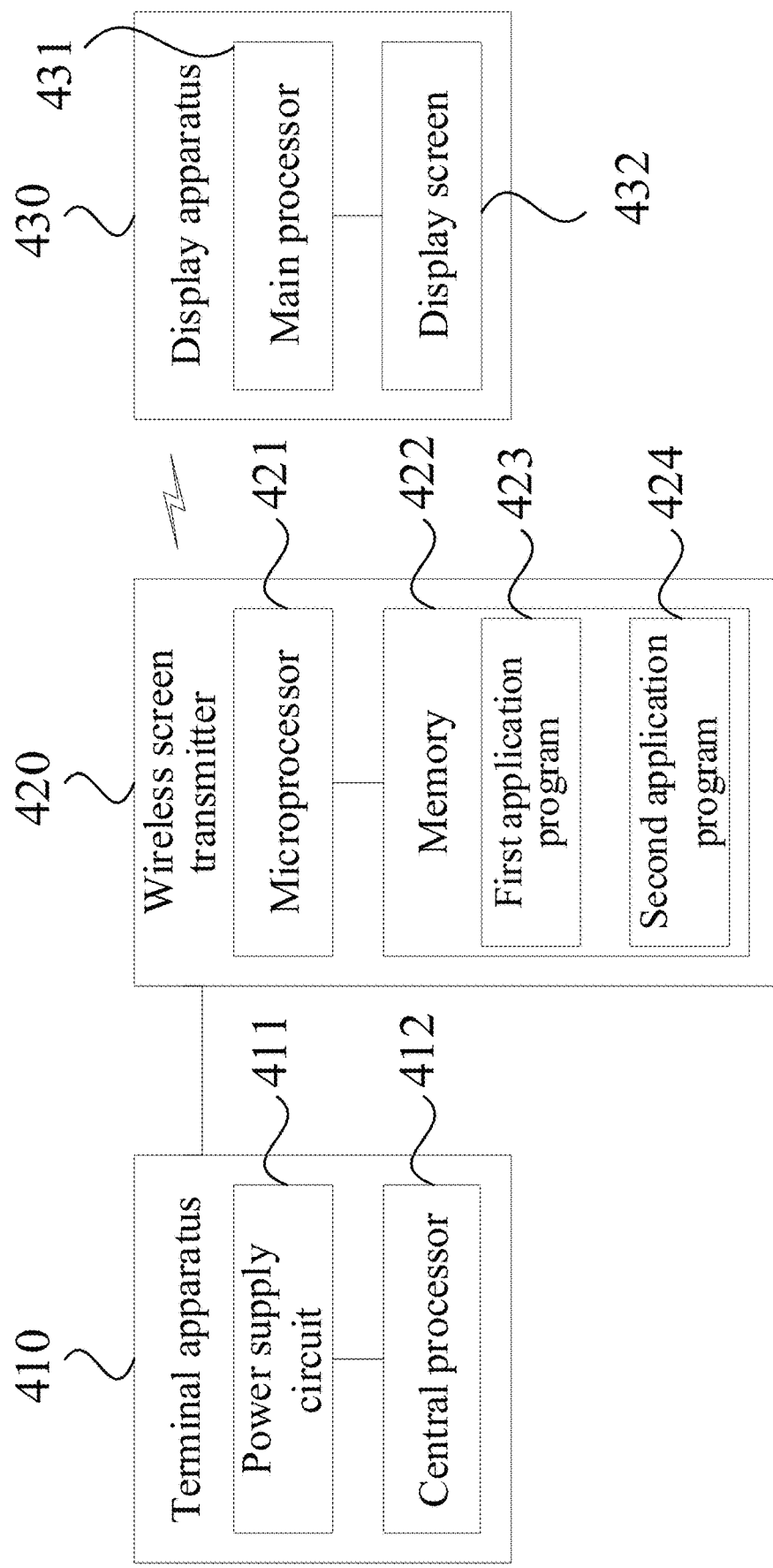
FIG. 7 is a structure diagram of a conference system provided by an embodiment of the present disclosure.

FIG. 7 is a structure diagram of a conference system provided by an embodiment of the present disclosure. Referring to FIG. 7, the conference system includes a terminal apparatus 410, a wireless screen transmitter 420, and a display apparatus 430. Therein, the wireless screen transmitter 420 is respectively connected with the terminal apparatus 410 and the display apparatus 430; the wireless screen transmitter 410 stores a first application program 423 and a second application program 424; the first application program 423 and the second application program 424 can be stored in the memory 422 of the wireless screen transmitter 410; the terminal apparatus 410 includes a power supply circuit 411 and a central processor 412, the wireless screen transmitter 410 includes a microprocessor 421, and the display apparatus 430 includes a display screen 432 and a main processor 431, wherein:
 the power supply circuit 411 is configured to provide working voltage for the wireless screen transmitter 420 when the wireless screen transmitter 420 is connected with the terminal apparatus 410;
 the central processor 412 is configured to send an enquiry data packet to the wireless screen transmitter 420;
 the microprocessor 421 is configured to send response information to the terminal apparatus 410, wherein the response information includes that the wireless screen transmitter 420 supports a DP working mode;
 the central processor 412 is further configured to send media data in DP protocol format to the wireless screen transmitter 420;
 the microprocessor 421 is further configured to send the first application program to the terminal apparatus 410;
 the central processor 412 is further configured to control pop-up of a first confirmation window on the screen of the terminal apparatus 410, and receive an instruction of executing the first application program 423 through the first confirmation window, wherein the first application program 423 includes a privacy recognition program, which is used to recognize the privacy window in the media content exhibited on the screen of the terminal apparatus 410 and acquire its position information;
 the central processor 412 is further configured to send the position information to the wireless screen transmitter 420;
 the microprocessor 421 is further configured to execute the second application program 424 based on the received position information and media data, wherein the second application program 424 includes a privacy processing program, and the second application program 424 is used to perform privacy processing on the media data according to the position information;
 the microprocessor 421 is further configured to send the media data after the privacy processing to the display apparatus 430; and
 the main processor 431 is configured to control the display screen 432 to display the received media data.

In some implementations, when the terminal apparatus 410 executes the first application program 423 and recognizes that there is a privacy window in the media content exhibited on the current screen, a second confirmation window pops up on the screen of the terminal apparatus 410. Therein, the second confirmation window is used to receive a privacy-processing confirmation instruction, and the privacy-processing confirmation instruction is used to indicate increasing and/or reducing a privacy windows for the privacy processing;

The terminal apparatus 410 acquires the confirmed privacy window according to the privacy-processing confirmation instruction, and sends the position information corresponding to the confirmed privacy window to the wireless screen transmitter 420.

In some implementations, the central processor 412 is further configured to pop up a second confirmation window when the privacy window displayed for the first time appears in the media content exhibited on the current screen of the terminal apparatus 410.

In some implementations, the privacy recognition program includes a preset list, wherein the preset list includes privacy-window model information. When the terminal apparatus 410 executes the privacy recognition program, window information corresponding to the media content exhibited on the current screen is acquired. If the window information matches the privacy-window model information, it confirms that there is a privacy window in the media content exhibited on the current screen, and the position information of the privacy window is sent to the wireless screen transmitter 420.

In some implementations, the wireless screen transmitter 420 adds an apparatus identification of the terminal apparatus 410 to the media data.

In some implementations, the central processor 412 is further configured to pop up a second confirmation window when the terminal apparatus 410 receives a window trigger instruction.

The conference system provided by the embodiments of the present disclosure can be used to perform or cooperate with any one of data transmission methods provided in the above embodiments, which have corresponding functions and beneficial effects.

It is worth noting that in the above embodiment of the conference system, the units and modules included are only divided according to the functional logic, but not limited to the above division, as long as the corresponding functions can be realized. In addition, the specific names of each functional unit are only for the purpose of distinguishing each other, and are not used to limit the claimed scope of the present disclosure.

Figure 8:
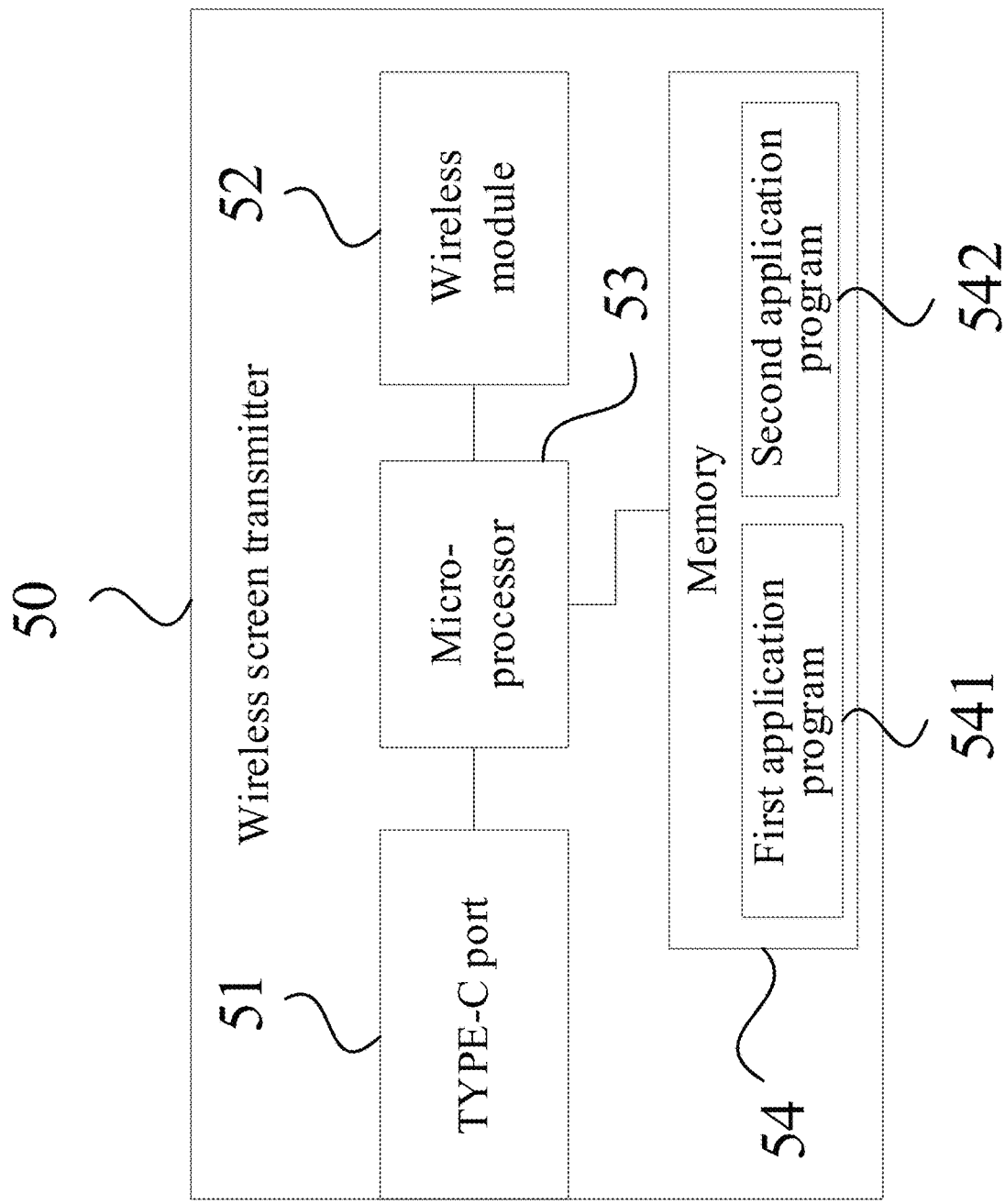
FIG. 8 is a structure diagram of a wireless screen transmitter provided by an embodiment of the present disclosure.

FIG. 8 is a structure diagram of a wireless screen transmitter provided by an embodiment of the present disclosure. Referring to FIG. 8, the wireless screen transmitter includes a Type-C port 51, a wireless module 52, a microprocessor 53 and a memory 54. The Type-C port 51, the memory 54 and the wireless module 52 are electrically connected with the microprocessor 53. The memory 54 stores a first application program 541 and a second application program 542, the first application program 541 includes a privacy recognition program, and the second application program 542 includes a privacy processing program. The Type-C port 51 includes a first data port and a second data port.

The microprocessor 53 is configured to: receive media data in DP protocol format through the first data port, wherein the media data is a media content currently exhibited on a screen of a terminal apparatus, the microprocessor 53 controls to acquire the first application program 541 from the memory 54 and output the first application program 541 to the terminal apparatus through the second data port, and the first application program 541 is used to recognize the privacy window in the media content exhibited on the screen of the terminal apparatus and acquire its position information; receive the position information sent by the terminal apparatus through the second data port, wherein the position information is position information of the private window in the media content displayed on the screen of the terminal apparatus; execute the second application program 542 based on the position information and media data, wherein the second application program 542 is used to perform privacy processing on the media data according to the position information; and send media data after privacy processing to the display apparatus through the wireless module 52.

In some implementations, the privacy recognition program includes a preset list, wherein the preset list includes privacy-window model information, and the privacy window is recognized according to the privacy-window model information.

In some implementations, the wireless screen transmitter 50 adds an apparatus identification of the terminal apparatus to the media data.

The wireless screen transmitter provided by the embodiment of the present disclosure can be used to perform or cooperate with any one of data transmission methods provided in the above embodiments, which have corresponding functions and beneficial effects.

It is worth noting that in the above embodiment of the wireless screen transmitter, each unit and module included is only divided according to the functional logic, but not limited to the above division, as long as the corresponding functions can be realized. In addition, the specific names of each functional unit are only for the purpose of distinguishing each other, and are not used to limit the claimed scope of the present disclosure.

The embodiment of the present disclosure further provides a data transmission device, and the data transmission device includes a Type-C port, a wireless module, a microprocessor and a memory, the Type-C port, the memory and the wireless module are electrically connected with the microprocessor, and the memory stores a first application program and a second application program.

The microprocessor is configured to:
receive media data in DP protocol format through the Type-C port, wherein the media data is a media content currently exhibited on a screen of a terminal apparatus;
send the first application program to the terminal apparatus through the Type-C port, and receive the position information sent by the terminal apparatus, wherein the position information is position information of the privacy window in the media content exhibited on the screen of the terminal apparatus, the first application program includes a privacy recognition program, and is used to recognize the privacy window in the media content exhibited on the screen of the terminal apparatus and acquire its position information;
execute a second application program based on the position information and the media data, wherein the second application program includes a privacy processing program, and is used to perform privacy processing on the media data according to the position information; and
encode the media data after the privacy processing and then send it to the display apparatus through the wireless module.

In some implementations, the Type-C port includes a first data port and a second data port.

Correspondingly, the step of receiving media data in DP protocol format through the Type-C port includes:
receiving the media data in DP protocol format through the first data port of Type-C port.

The step of sending the first application program to the terminal apparatus through the Type-C port includes:

sending the first application program to the terminal apparatus through the second data port of the Type-C port, and receiving the position information sent by the terminal apparatus.

In some implementations, the privacy recognition program includes a preset list, the preset list includes privacy-window model information, and the privacy window is recognized according to the privacy-window model information.

In some implementations, the media data is added with an apparatus identification of the terminal apparatus.

The data transmission device provided by the embodiment of the present disclosure can be used to perform or cooperate with any one of the data transmission methods provided in the above embodiments, which have corresponding functions and beneficial effects.

It is worth noting that in the embodiment of the above data transmission device, each unit and module included is only divided according to the functional logic, but not limited to the above division, as long as the corresponding functions can be realized. In addition, the specific names of each functional unit are only for the purpose of distinguishing each other, and are not used to limit the claimed scope of the present disclosure.

The embodiment of the present disclosure further provides a storage medium including computer executable instructions, the computer executable instructions are used to perform relevant operations in a data transmission method provided in any one of embodiments of the present disclosure when executed by a computer processor, and have corresponding functions and beneficial effects.

Those skilled in the art should understand that embodiments of the present disclosure can be provided as methods, systems, or computer program products.

Therefore, the present disclosure may adopt the form of a complete hardware embodiment, a complete software embodiment, or an embodiment combining software and hardware. Moreover, the present disclosure may adopt the form of a computer program product implemented on one or more computer-usable storage media (which may include but not limited to disk storage, CD-ROM, optical storage, etc.) including computer-usable program codes. The present disclosure is described with reference to flowcharts and/or block diagrams of methods, apparatuses (systems), and computer program products in embodiments of the present disclosure. It should be understood that each process and/or block in the flowchart and/or block diagram, and the combination of processes and/or blocks in the flowchart and/or block diagram can be implemented by computer program instructions. These computer program instructions can be provided to the processor of a general-purpose computer, a special-purpose computer, an embedded processor, or other programmable data processing apparatus to generate a machine, so that with the instructions executed by the processor of the computer or other programmable data processing apparatus, a device that is used to implement the functions specified in one process or multiple processes in the flowchart and/or one block or multiple blocks in the block diagram is generated. These computer program instructions can also be stored in a computer-readable memory that can direct a computer or other programmable data processing apparatus to work in a specific manner, so that the instructions stored in the computer-readable memory produce an article of manufacture including the instruction device, and the instruction device implements the functions specified in one process or multiple processes in the flowchart and/or one block or multiple blocks in the block diagram. These computer program instructions can also be loaded on a computer or other programmable data processing apparatus, so that a series of operation steps are executed on the computer or other programmable equipment to produce computer-implemented processing, thus the instructions executed on the computer or other programmable apparatus provide steps for implementing functions specified in a flow or multiple flows in the flowchart and/or a block or multiple blocks in the block diagram.

In a typical configuration, the computing apparatus includes one or more processors (Central Processing Units (CPUs)), input/output ports, network port, and memory. The memory may include non-permanent memory, Random Access Memory (RAM) and/or non-volatile memory, etc. in a computer-readable medium, such as Read-Only Memory (ROM) or flash memory (e.g., flash RAM). The memory is an example of a computer-readable medium.

Computer-readable storage media include permanent and non-permanent, removable and non-removable media, and information storage can be achieved by any method or technology. The information can be computer-readable instructions, data structures, program modules, or other data. Examples of computer-readable storage media include, but are not limited to: Phase-change RAM (PRAM), Static RAM (SRAM), Dynamic RAM (DRAM), other types of RAM, ROM, Electrically Erasable Programmable ROM (EEPROM), flash memory or other memories, Compact Disc Read-Only Memory (CD-ROM), Digital Versatile Disc (DVD) or other optical storage, magnetic cassette tape, magnetic disk storage or other magnetic storage apparatuses or any other non-transmission media which can be used to store information capable of being accessed by computing apparatuses. According to the definition in the present disclosure, computer-readable media does not include transitory media, such as modulated data signals and carrier waves.

It should also be noted that the terms "include," "comprise," or any other variants thereof are intended to cover non-exclusive inclusion, so that a process, method, commodity or equipment including a series of elements not only includes those elements, but also includes other elements that are not explicitly listed, or also include elements inherent to such processes, methods, commodities, or equipment. If there are no more restrictions, the element defined by the sentence "including a . . . " does not exclude the existence of other identical elements in the process, method, commodity, or equipment that includes the element.

It should be noted that the above is only preferred embodiments of the present disclosure and the applied technical principle. Those skilled in the art will understand that the present disclosure is not limited to the specific embodiments described herein, and it is possible for those skilled in the art to make various obvious changes, readjustments and substitutions without departing from the claimed scope of the present disclosure. Therefore, although the present disclosure has been described in more detail through the above embodiments, the present disclosure is not limited to the above embodiments, and may include more equivalent embodiments without departing from the inventive concept. The scope of the present disclosure is determined by the scope of the appended claims.

What is claimed is:

1. A data transmission method, applied to a conference system, wherein the conference system comprises a terminal apparatus, a wireless screen transmitter, and a display apparatus, the wireless screen transmitter is respectively connected with the terminal apparatus and the display apparatus, and the wireless screen transmitter is configured to store a first application program and a second application program, and the method comprises:

when the wireless screen transmitter is connected with the terminal apparatus, providing, by the terminal apparatus, working voltage for the wireless screen transmitter;

sending, by the terminal apparatus, an enquiry data packet to the wireless screen transmitter;

sending, by the wireless screen transmitter, response information to the terminal apparatus, wherein the response information comprises that the wireless screen transmitter supports a Display Port (DP) working mode;

sending, by the terminal apparatus, media data in DP protocol format to the wireless screen transmitter;

sending, by the wireless screen transmitter, the first application program to the terminal apparatus;

popping up a first confirmation window on a screen of the terminal apparatus, and receiving an instruction of executing the first application program through the first confirmation window, wherein the first application program comprises a privacy recognition program, and is configured to recognize a privacy window in a media content exhibited on the screen of the terminal apparatus and acquire its position information;

sending, by the terminal apparatus, the position information to the wireless screen transmitter;

executing, by the wireless screen transmitter, the second application program based on received position information and media data, wherein the second application program comprises a privacy processing program, and the second application program is configured to perform privacy processing on the media data according to the position information;

sending, by the wireless screen transmitter, media data after the privacy processing to the display apparatus; and displaying, by the display apparatus, received media data.

2. The method according to claim 1, wherein, when executing, by the terminal apparatus, the first application program and recognizing that there is a privacy window in the media content exhibited on the current screen, popping up a second confirmation window on the screen of the terminal apparatus, wherein the second confirmation window is configured to receive a privacy-processing confirmation instruction, and the privacy-processing confirmation instruction is configured to indicate increasing or reducing a privacy window for privacy processing, and wherein the method further comprises:
acquiring, by the terminal apparatus, confirmed privacy window according to the privacy-processing confirmation instruction; and
sending position information corresponding to the confirmed privacy window to the wireless screen transmitter.

3. The method according to claim 2, wherein the method further comprises:
when the privacy window displayed for the first time appears in the media content exhibited on the current screen of the terminal apparatus, popping up the second confirmation window.

4. The method according to claim 1, wherein the privacy recognition program comprises a preset list, and the preset list comprises privacy-window model information, and the method further comprises:
when executing, by the terminal apparatus, the privacy recognition program, acquiring, by the terminal apparatus, window information corresponding to the media content exhibited on the current screen; and
when the window information matches the privacy-window model information, confirming, by the terminal apparatus, that there is a privacy window in the media content exhibited on the current screen, and sending position information of the privacy window to the wireless screen transmitter.

5. The method according to claim 1, wherein the wireless screen transmitter adds an apparatus identification of the terminal apparatus to the media data.

6. The method according to claim 2, wherein the method further comprises:
when the terminal apparatus receives a window trigger instruction, popping up the second confirmation window.

7. A data transmission method, applied to a wireless screen transmitter, wherein the wireless screen transmitter comprises a Type-C port, a wireless module, a microprocessor, and a memory, wherein the Type-C port, the memory, and the wireless module are electrically connected with the microprocessor, the memory is configured to store a first application program and a second application program, the first application program comprises a privacy recognition program, the second application program comprises a privacy processing program, and the Type-C port comprises a first data port and a second data port, and the method comprises:

receiving media data in Display Port (DP) protocol format through the first data port, wherein the media data is a media content currently exhibited on a screen of a terminal apparatus;

controlling, by the microprocessor, to acquire the first application program from the memory and output the first application program to the terminal apparatus through the second data port, wherein the first application program is configured to recognize a privacy window in the media content exhibited on the screen of the terminal apparatus and acquire its position information;

receiving position information sent by the terminal apparatus through the second data port, wherein the position information is position information of the privacy window in the media content exhibited on the screen of the terminal apparatus;

executing, by the microprocessor, the second application program based on the position information and the media data, wherein the second application program is configured to perform privacy processing on the media data according to the position information; and sending, by the wireless module, media data after privacy processing to the display apparatus.

8. The method according to claim 7, wherein the privacy recognition program comprises a preset list, the preset list comprises privacy-window model information, and the privacy window is recognized according to the privacy-window model information.

9. The method according to claim 7, wherein the wireless screen transmitter adds an apparatus identification of the terminal apparatus to the media data.

10. A data transmission method, comprising:
receiving media data in Display Port (DP) protocol format through a Type-C port, wherein the media data is a media content currently exhibited on a screen of a terminal apparatus;
sending a first application program to the terminal apparatus through the Type-C port, and receiving position information sent by the terminal apparatus, wherein the position information is position information of a privacy window in the media content exhibited on the screen of the terminal apparatus, the first application program comprises a privacy recognition program, and is configured to recognize the privacy window in the media content exhibited on the screen of the terminal apparatus and acquire its position information;
executing a second application program based on the position information and the media data, wherein the second application program comprises a privacy processing program, and is configured to perform privacy processing on the media data according to the position information; and
encoding media data after the privacy processing and sending the encoded media data to the display apparatus.

11. The method according to claim 10, wherein the Type-C port comprises a first data port and a second data port,
wherein receiving the media data in DP protocol format through the Type-C port comprises:
receiving the media data in DP protocol format through the first data port of the Type-C port,
wherein sending the first application program to the terminal apparatus through the Type-C port, and receiving position information sent by the terminal apparatus comprises:
sending the first application program to the terminal apparatus through the second data port of the Type-C port, and receiving position information sent by the terminal apparatus.

12. The method according to claim 10, wherein the privacy recognition program comprises a preset list, the preset list comprises privacy-window model information, and the privacy window is recognized according to the privacy-window model information.

13. The method according to claim 10, wherein the media data is added with an apparatus identification of the terminal apparatus.

14. A wireless screen transmitter, comprising:
a Type-C port;
a wireless module;
a microprocessor; and
a memory, wherein the Type-C port, the memory, and the wireless module are electrically connected with the microprocessor, the memory is configured to store a first application program and a second application program, the first application program comprises a privacy recognition program, the second application program comprises a privacy processing program, and the Type-C port comprises a first data port and a second data port, wherein the microprocessor is configured to:
receive media data in Display Port (DP) protocol format through the first data port, wherein the media data is a media content currently exhibited on a screen of a terminal apparatus;
control to acquire the first application program from the memory and output the first application program to the terminal apparatus through the second data port, wherein the first application program is configured to recognize a privacy window in the media content exhibited on the screen of the terminal apparatus and acquire its position information;
receive position information sent by the terminal apparatus through the second data port, wherein the position information is position information of the privacy window in the media content exhibited on the screen of the terminal apparatus;
execute the second application program based on the position information and the media data, wherein the second application program is configured to perform privacy processing on the media data according to the position information; and
send media data after privacy processing to the display apparatus through the wireless module.

15. The wireless screen transmitter according to claim 14, wherein the privacy recognition program comprises a preset list, the preset list comprises privacy-window model information, and the privacy window is recognized according to the privacy-window model information.

16. The wireless screen transmitter according to claim 14, wherein the wireless screen transmitter adds an apparatus identification of the terminal apparatus to the media data.

* * * * *